J. ROEDEL.
AUTO TRAILER CONNECTOR.
APPLICATION FILED APR. 29, 1914.
1,118,236.
Patented Nov. 24, 1914.
3 SHEETS—SHEET 1.
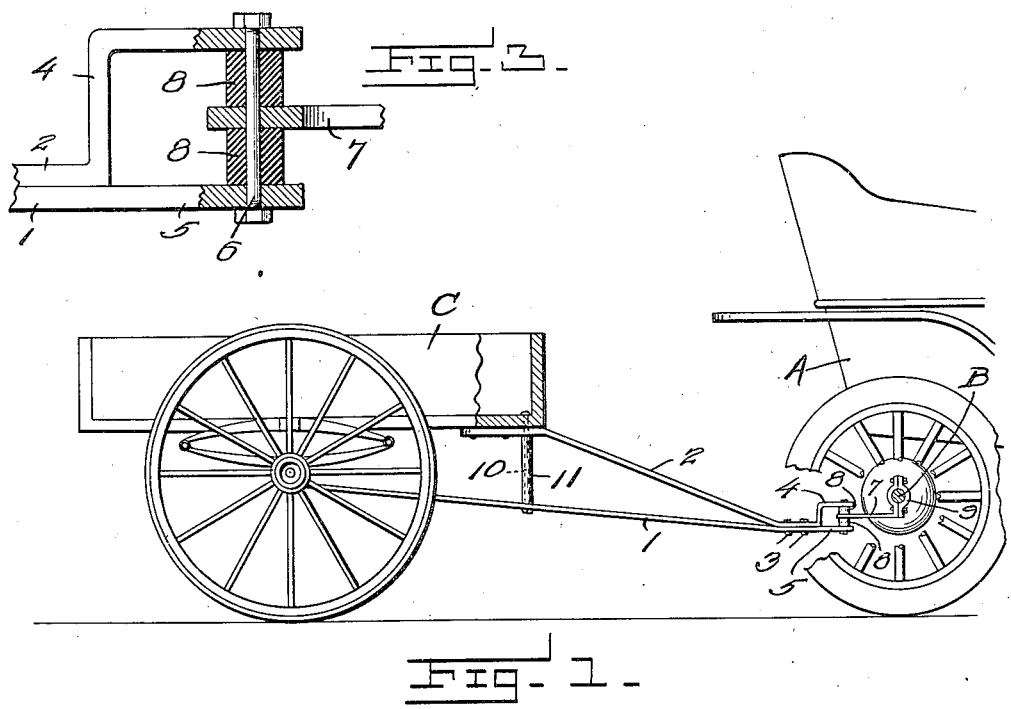
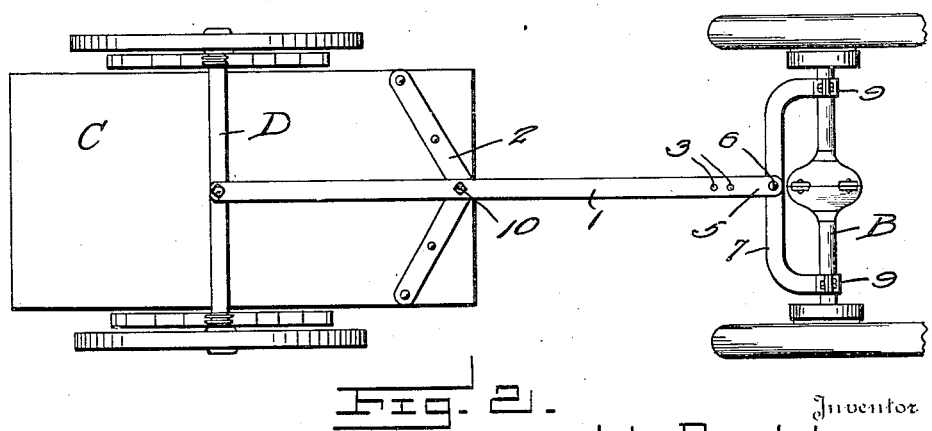
Inventor
John Roedel.
Witnesses
Edward A. Conroy
Lester L. Sargent
By Jerry A. Mathews
Attorney

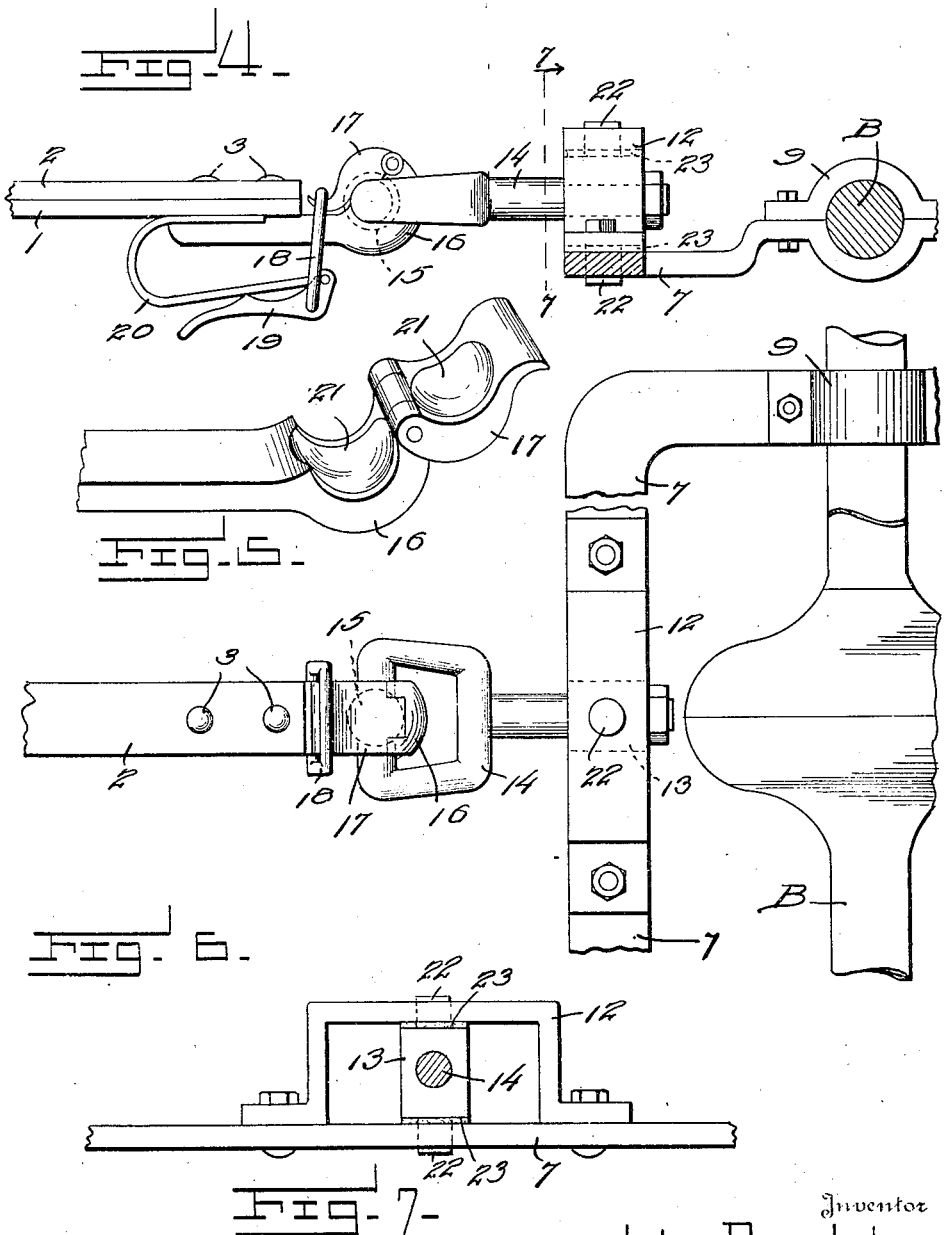

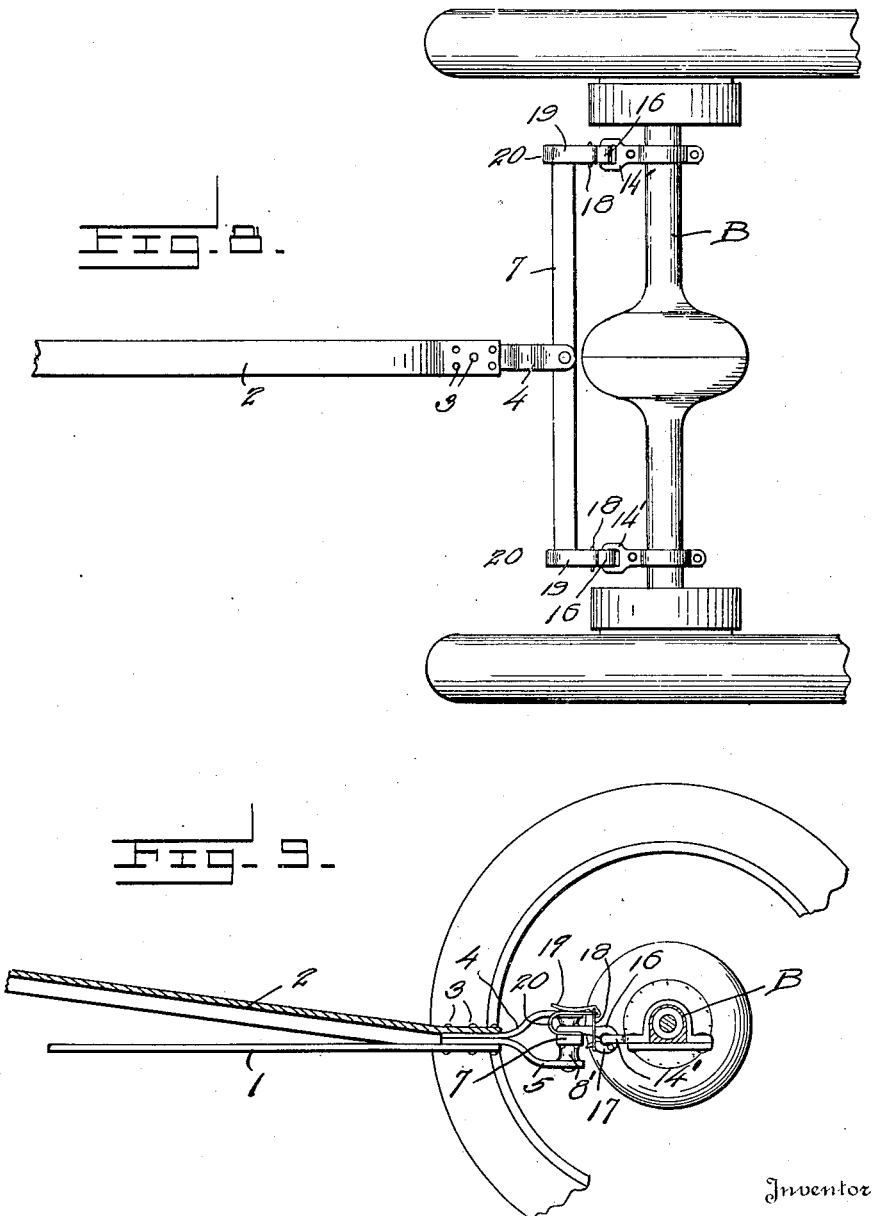

UNITED STATES PATENT OFFICE.

JOHN ROEDEL, OF DEFIANCE, OHIO.

AUTO-TRAILER CONNECTOR.

1,118,236.

Specification of Letters Patent.　　Patented Nov. 24, 1914.

Application filed April 29, 1914.　Serial No. 835,132.

*To all whom it may concern:*

Be it known that I, JOHN ROEDEL, a citizen of the United States, residing at Defiance, in the county of Defiance and State of Ohio, have invented a new and useful Auto-Trailer Connector, of which the following is a specification.

The object of my invention is to provide an efficient device for trailing a cart behind an automobile; to provide novel cart-attaching means; to provide novel auto axle-attaching means; and to provide novel means for affording the necessary relative movement or play between the cart-attaching means and the auto-axle attaching means.

It is a further object of my invention to provide a novel modified form of my invention having novel means for readily and quickly disconnecting the trailed cart from the towing vehicle, without the necessity of removing bolts, or the like.

It is a further object of my invention to provide in a device of this kind, novel resilient means for allowing of tilting movements of the cart-attaching means relative to the auto axle-attaching means.

I attain these and other objects of my invention by the mechanism illustrated in the accompanying drawings, in which—

Figure 1 is a side elevation of the original form of my invention, attached to two vehicles; Fig. 2 is a bottom plan of same; Fig. 3 is a detail view of my resilient members 8; Fig. 4 is a side elevation, partly in section, of a modified form; Fig. 5 is a perspective detail view of members 16 and 17; Fig. 6 is a top plan of Fig. 4; Fig. 7 is a detail section on line 7—7 of Fig. 4; Fig. 8 is a top plan view of another form of my invention; Fig. 9 is a side view of Fig. 8.

Like characters of reference indicate like parts throughout the several views.

The purpose of my invention is to connect a cart C to the axle B of a forward or towing automobile A. My cart-attaching means comprises member 1 attached to the cart; a member 2 attached to the forward portion of the cart; bolt 10 securing members 1 and 2 to the cart, and sleeve 11 operating as a bracing and spreading member for members 1 and 2 as indicated in Fig. 1; and fastening members 3 at or near the forward ends or converging portions of members 1 and 2. It is within the contemplation of my invention to attach member 1 either to the cart body or to axle D.

My auto-axle-attaching means, in the original form of my invention, comprises a transverse member 7, preferably of U-shape, secured to portions of the rear axle B of the automobile by clamps 9. By means for operatively connecting the cart-attaching means above described with my auto-axle-attaching means above described, in the original form of my invention, whereby to afford the necessary or desirable relative movement or play between the aforesaid devices, comprises diverging arm members 4 and 5 attached to or preferably integrally formed with members 2 and 1; a pivotal connecting member or bolt 6 operatively connecting the spaced ends of members 4 and 5; and resilient members 8 of rubber or the like supported or mounted on member 6 between the spaced ends of members 4 and 5 and flexibly or resiliently engaging transverse member 7, as shown in detail in Fig. 3.

In operation, the pivotal connection of member 7 with member 6 affords the necessary free lateral movement of the cart-attaching means relative to the auto axle-attaching means, and resilient members 8 allow needed relative vertical and tilting movement or play for the ordinary demands upon a device of this class.

In the modified form of my invention illustrated in Figs. 4, 5, 6 and 7, I employ the identical cart-attaching means hereinabove described and the identical auto-axle-attaching means hereinabove described, but in lieu of members 4, 5, 8 and 6 employ novel means for operatively connecting the cart-attaching means with the auto axle-attaching means, whereby free relative vertical and free relative lateral movement of the above-mentioned means is provided, and whereby means is also provided for easily and quickly uncoupling the portion of my invention attached to the cart from the portion of my invention attached to the auto axle. Referring to Fig. 7, I provide a bracket member 12 attached to member 7 which is operatively secured to the auto axle by clamps 9 as heretofore set forth. I provide a pivotally mounted member 22, (provided with washers 23, preferably of leather,) to which a link 14 is fastened. Attached to the cart-attaching means I provide a coupling device operatively connectible to the link 14. The coupling device comprises a body portion 16 having a tongue 17 pivotally mounted to it, adapted to be engaged by a link 18, operated by latch 19 attached to spring 20, members 16 and 17 preferably being concaved at 21, as indicated in Fig. 5, for receiving a ball-shaped portion 15, preferably provided on link 14, as indicated in Figs. 4 and 6.

In operation, free lateral movement of the device is afforded by pivot 22, and free vertical movement is afforded by the pivotal connection of link 14 with the coupling device set forth. The coupling device set forth provides convenient means for releasing the cart-attaching means heretofore set forth from the link when it is desired to disconnect the cart from the automobile by which it is towed. Latch 19, controlled by spring 20, operates link 18, whereby tongue 17, may be engaged or released from engagement, and opened as indicated in Fig. 5 for the release of link 14 from attachment to it.

In the form of my invention illustrated in Figs. 8 and 9, I provide members 4 and 5 operating substantially as set forth in the original form of my invention, save that they are not integral with members 2 and 1, respectively. I further provide members 8' between which transverse member 7 is mounted, and which differ from members 8 heretofore described in that they are not resilient elements, thus permitting only lateral movement of member 7 and not tilting movements. To afford the necessary free relative vertical movement of the cart-attaching means relative to the fixed means, indicated by 14' for attaching the device to the automobile axle, I employ the identical coupling devices heretofore described in detail in connection with the form of my invention illustrated in Figs. 4, 5, 6 and 7, but mounted to the ends of transverse member 7, and operatively connectible with the fixed axle-attached means 14' to afford free vertical movement, and also affording means for quickly unlatching and disconnecting the cart from the towing automobile.

What I claim is:

1. The combination of cart-attaching means adapted for rigid engagement with a cart body, axle-attaching means adapted for rigid engagement with spaced portions of the rear axle of a forward vehicle, and means pivotally connecting the cart-attaching means to the axle-attaching means to afford unrestricted relative lateral movement and unrestricted relative vertical movement of the connected means.

2. The combination of cart-attaching means, including vertically spaced cart tongue members adapted to be attached to the body of a cart and secured to the forward portion of the cart by a bolt and sleeve brace member separating the aforesaid tongue members and converging near their outer ends and having diverging arm members in which the tongue members terminate, and means pivotally connecting the aforesaid cart-attaching means with the rear axle of an automobile to afford relative lateral and vertical movement.

3. The combination of cart-attaching means rigidly secured to a trailed vehicle; means for pivotally connecting the cart-attaching means with a transverse member to afford relative lateral and vertical movement; a transverse member clamped to the rear axle of an automobile at opposite portions of said axle; and spring-controlled latch means operatively connecting the means secured to the towed vehicle with the means secured to the towing vehicle to allow facile connection and disconnection of the towed vehicle from operative engagement with the towing vehicle without removal of the means rigidly affixed to the two vehicles, substantially as set forth.

4. The combination of means rigidly secured to the body of a trailed cart for towing same; a transverse member, means pivotally connecting the transverse member with the means attached to the trailed cart, means for affixing the transverse member to opposite portions of the rear axle of a towing vehicle, and coupling means operatively connecting rear-vehicle attached means to the forward-vehicle-attached means to provide a relative vertical movement of the means attached to the towed vehicle and the means affixed to the towing vehicle, the aforesaid means including a spring-controlled latch, tongue and link members adapted to readily lock or release the device as a whole in or from operative engagement to connect or disconnect the two vehicles, substantially as set forth.

In testimony whereof, I hereunto affix my signature, in the presence of two witnesses.

JOHN ROEDEL.

Witnesses:
  Dey Cryers,
  J. A. Demdorfer.